Patented May 31, 1938

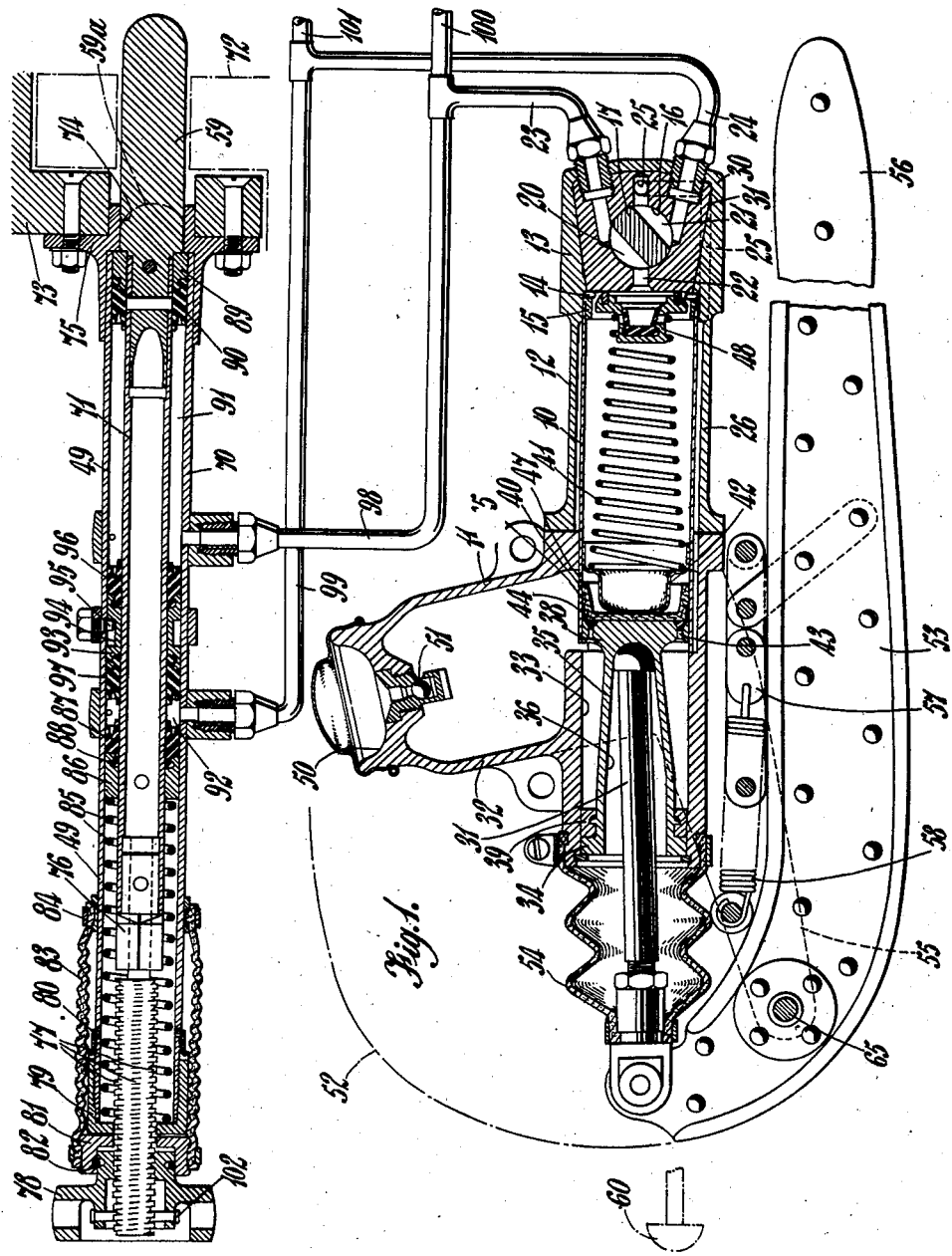

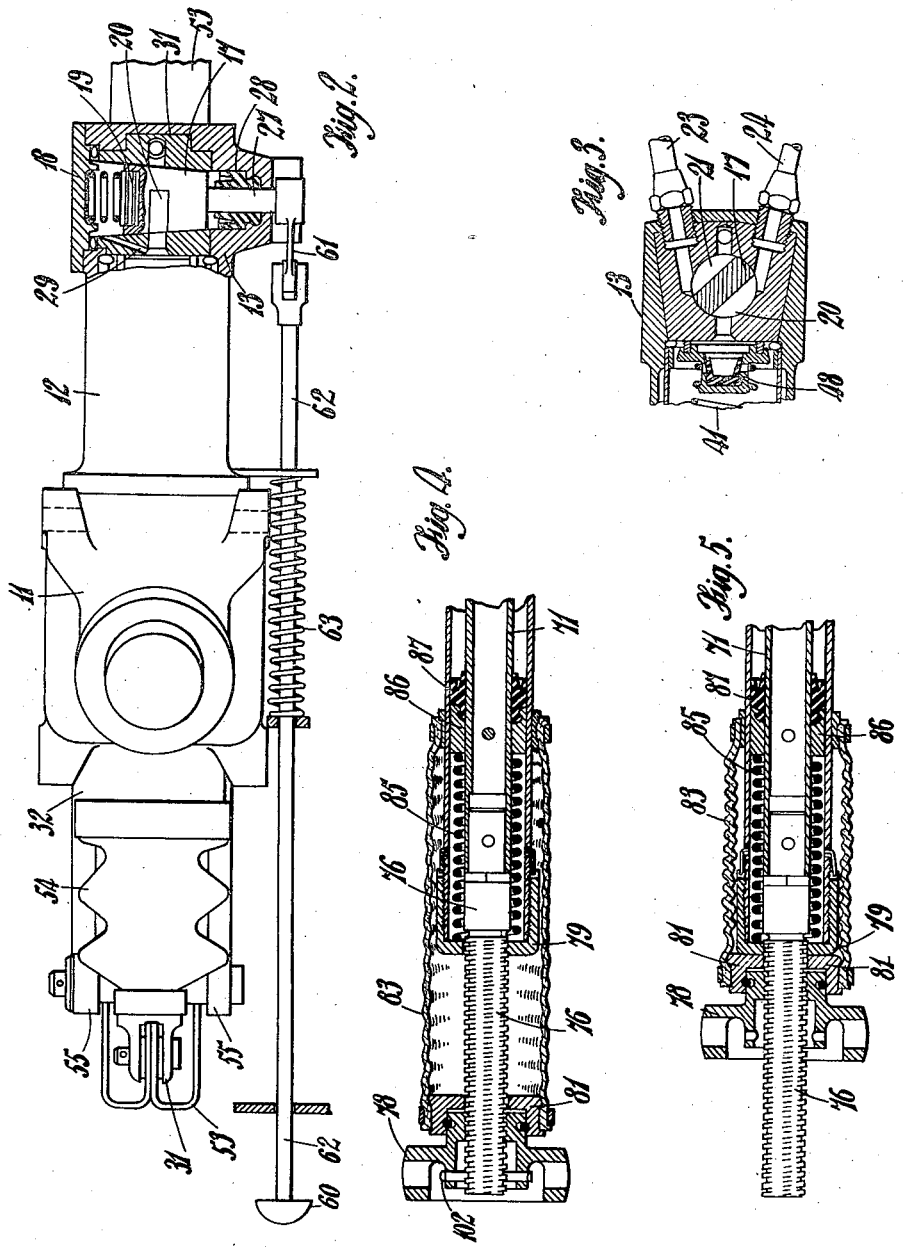

2,119,416

UNITED STATES PATENT OFFICE 2,119,416

HYDRAULIC CONTROLLING APPARATUS

Francis Victor Brown, London, England, assignor to Automotive Products Company Limited, London, England Application October 14, 1935, Serial No. 45,003 In Great Britain February 16, 1935

5 Claims. (Cl. 60—52)

This invention relates to hydraulically actuated apparatus and controls particularly for aircraft, and it has for its object to provide an improved method of operation as well as a new construction of apparatus which is more efficient and reliable than those installations which have hitherto been proposed.

The improved method of actuating a hydraulically controlled motor cylinder of an aircraft consists in interposing between the master cylinder and the motor cylinder, a valve which is spring-influenced so as normally to assume a position in which operation of the master cylinder tends to move the motor cylinder in a preferred to "safe" direction, positive adjustment of the valve being required for otherwise actuating the motor cylinder.

The invention further provides an improved construction of hydraulic controlling system for an aircraft, comprising in combination with a master cylinder, a change-over valve whereby liquid under pressure can be fed through either one of a plurality of delivery pipes, a pair of such pipes conveniently being provided and the valve being arranged so that pressure liquid delivered by the master cylinder can be passed along either of said pipes, the other pipe being automatically relieved of pressure.

The invention further provides a hydraulic controlling system comprising in combination a single acting master cylinder, a double acting motor cylinder, and a change-over valve whereby the delivery of the master cylinder can be connected to either side of the motor cylinder, that side of the motor cylinder not being fed with liquid from the master cylinder conveniently being automatically allowed to discharge through the change-over valve.

Moreover the invention also provides a controlling system comprising in combination with a single acting master cylinder, the piston of which is associated with a free packing cup adapted to cover a breathing aperture in the cylinder wall at the beginning of its stroke, a motor cylinder having one boundary of its working space arranged for limited lost motion, whereby the first part of the master cylinder stroke is effected with only a low pressure load. The change-over valve which is associated with the master cylinder is preferably influenced to return automatically to a preferred setting after use in any other setting, thus making reasonably sure that any unauthorized actuation of the master cylinder will only tend to move the motor cylinder in the preferred direction.

One form of spar attachment pin system for an aircraft is illustrated in the accompanying drawings as an example of the present invention, and in said drawings:—

Figure 1 is a sectional side elevation showing the master cylinder unit and one of the spar attachment pins;

Figure 2 is a part sectional plan of the master cylinder unit shown in Figure 1;

Figure 3 is a fragmentary sectional elevation showing the control valve in the position required for withdrawing the spar pins;

Figure 4 is a fragmentary section through that end portion of the attachment pin remote from the nose of the plunger, the latter being in its hydraulically withdrawn position; and Figure 5 is a view corresponding to Figure 4 except that the plunger has been mechanically withdrawn, as for example when the hydraulic part of the system is disabled.

The master cylinder unit comprises a horizontally arranged cylinder barrel 10 secured in the lower part of a reservoir casting 11 and protruding therefrom, said cylinder barrel being enclosed in a barrel cover 12 attached conveniently to the reservoir at one end and closed at its other end to form the cylinder head 13. In order to provide a pressure-tight joint at this part a packing washer 14 is inserted, this being conveniently of the internal gas pressure type, and being arranged to bear against a reinforcing ring 15 secured to the cylinder tube 10. The cylinder head 13 is transversely bored at 16 to receive a frusto-conical plug 17 forming a change-over valve, said plug being urged against its conical bore 16 by means of a compression spring 18 (see Figure 2) and a ball thrust bearing 19. Said plug 17 is also formed with a pair of tangential grooves 20 and 21 the first of which is adapted to connect a main delivery passage 22 communicating with the master cylinder 10 to either one of a pair of outlet pipes 23 and 24, the other of said outlet pipes being automatically connected with the reservoir 11 by way of the groove 21, through a passage 25 bored in the cylinder head 13, and then through the annular space 26 between the cylinder 10 and the barrel cover 12. The valve plug 17 is operated by means of an axial stem 27 which extends through the wall of the cylinder head 13 where it is surrounded by a flexible packing washer 28 of substantially U-shaped radial cross-section. The valve plug 17, moreover, is normally urged against its seating 16 by pressure produced in the master cylinder 10, a subsidiary passage 29 being formed in the cylinder head 13 for this purpose. The cylinder head itself is composed of an outer shell 30 of light metal having an interior block 31 of phosphor bronze or other material suitable for the valve bore 16.

The wall 32 of the reservoir 11 opposite the open end of the master cylinder barrel is formed with an elongated auxiliary bore 33 extending coaxially with said master cylinder 10, and arranged to accommodate slidably an auxiliary piston 34 connected with the main piston by a hollow tapering sleeve 35. This sleeve 35 also forms a deep well 36 containing the ball-shaped end of a push rod 37, by means of which a main piston 38 and the auxiliary piston 34 can be moved towards the cylinder head 13. The auxiliary piston 34 is provided with a resilient packing ring 39 of rubber or equivalent, which, of course, need be only capable of withstanding the pressure head in the reservoir, but the main piston 38 which has to bear the comparatively high operating pressure is equipped with a rubber or other flexible piston cup 40 which is quite imperforate, but is normally held against the piston 38 by means of a conical compression spring 41 disposed within the master cylinder 10 and acting upon the outer portion of a cup-shaped thrust member 42. At the rear of the piston cup 40 the piston member 38 is formed with a number of longitudinal liquid passages 43, the forward ends of which communicate with an annular groove 44 of V-shaped radial cross-section, said groove accommodating a correspondingly shaped valve ring 45 which thus provides a smooth surface on the head of the piston for engagement with the back of the piston cup 40. The centre part of the thrust member 42 co-operating with the piston cup 40 is curved in diametral cross-section as will be seen in Figure 1 so as to produce in the rubber or equivalent material when pressure is applied by the compression spring, a pressure intensity which increases smoothly towards the centre of the cup. This construction has the main advantage that it permits the piston cup 40 to collapse readily during the return stroke of the piston and thus provide ample room for the release of the valve ring. The open end of the master cylinder 10 communicates, of course, with the reservoir through an opening 46, as well as with the auxiliary cylinder 33, while a breather hole or holes 47 is or are formed in the wall of the master cylinder at a place adjacent to but just in advance of the rim of the main piston cup 40, this hole or holes serving to equalize the pressure in the master cylinder 10 and reservoir 11 when the piston 38 is completely retracted, thus automatically replenishing the liquid in the operative part of the system should leakage have taken place. At its other smaller end the conical compression spring 41 acts upon a differential delivery valve 48 of the known form adapted to maintain a slight pressure in the motor cylinder or cylinders, for example the spar pin unit, the barrel of which is indicated at 49 in the drawings.

The filling aperture 50 of the reservoir 11 is conveniently bell-shaped, and is fitted with a valve 51 which permits the ingress of air but prevents the escape of liquid. The master unit can conveniently be installed on the leading edge of an aircraft wing which latter is indicated at 52 in Figure 1, the cylinder head 13 facing rearwardly, and for such an installation the push rod 31 operating the main piston 38 can conveniently be connected at its forward end to a curved operating lever 53, the projecting part of the push rod 31 being surrounded by a flexible boot 54. The operating lever is pivoted at 65 to a pair of arms 55 formed on or carried by the reservoir casting 11, the rear end of said lever being fitted with a convenient handle 56, while downward movement of said handle is limited by a toggle linkage 57 fitted with a coiled tension spring 58 adapted to return the lever 53 automatically to its raised position in which the main piston 38 is completely retracted. The control valve 17 in the cylinder head 13 is spring-influenced to assume its "safe" position, in which actuation of the lever 53 tends to move the plunger 59 of the spar pin unit 49 to its "bolted" position, but it is connected with a push button 60 conveniently placed on the leading edge 52 of the wing, and arranged so that the spar pin plungers 59 can only be withdrawn by the master cylinder unit when the push button 60 is depressed and the operating handle 56 is pulled downwardly, the valve 17 then being in the position shown in Figure 3. With the valve 17 in its other position as shown in Figure 1, downward movement of the operating handle 56 only tends to force the spar pin plungers 59 further out. For actuating the valve plug 17 the spindle 27 is fitted with an arm 61, which is pivotally connected to a push rod 62 carrying the push button 60, a coiled compression spring 63 being adapted to return said button automatically to the above-mentioned "safe" position.

For use with the master cylinder unit above described, a convenient construction of spar pin is shown in Figures 1, 4 and 5, and comprises an elongated tubular barrel 70 forming the main body of the assembly and fitted internally with a pin bolt 71 which is slidable in the axial direction. The nose or plunger 59 of this bolt, which plunger serves to co-act between the folding part 72 and the fixed part 73 of the aircraft wing, is of enlarged diameter, and fits into a bore 74 formed in a combined reinforcing tube and fixing flange attached to the end of the cylinder barrel. For lightness and ease of manufacture the central part 71 of the bolt pin is tubular, while its tail end 76 is solid and is of square cross-section, the corners being screw-threaded as indicated at 77 to co-act with a manual retracting hand nut 78. The adjacent end of the outer barrel is closed by an internal screw-threaded cap 79 conveniently provided with a locking washer 80, said cap being formed with a square hole through which the tail 76 of the bolt 71 passes, while a collar 81 also formed with a square hole to fit slidably upon the tail 76 of the pin is anchored axially to the hand nut 78, but is arranged with an expanding ring 82 so that said nut 78 can freely rotate upon the tail 76 of the bolt, whereas the collar 81 is held against such rotation by its square hole. The collar 81 thus serves as a non-rotatable anchorage for an extensible bellows or boot 83, the other end of which is connected to the outside of the tubular barrel by a clip 84. By this means, retracting movement of the pin bolt, irrespective of whether this movement is brought about hydraulically or mechanically, will move the screw-threaded tail out of the spring barrel and thus will serve as an indicator, while the boot 83 prevents the access of dirt into the screw-threads of the pin and the interior of the unit.

The tail end of the barrel 49 accommodates a coiled compression spring 85, one end of which abuts against the closure cap 79, while the other engages a tail piston collar 86 secured to the pin 71. At its other side this tail piston collar is fitted with a resilient washer or piston cup 87 which is, of course, annular in formation, and in radial cross-section is of substantially Y-shape, the tail portion 88 being adapted to engage in an undercut groove formed in the tail piston collar 89. The resilient cup 87 is, of course, truly cylindrical on its inner and outer surfaces, and is somewhat elongated in an axial direction so that the interior of the U-shaped part is disposed some distance from the part which is anchored in the undercut recess. This enables the piston cup to accommodate itself readily to inaccuracies and irregularities in the bore of the outer barrel 47, and also in the exterior surface of the pin bolt. A similar fitting 89 herein referred to as the head piston collar is attached to the pin bolt 71 immediately adjacent the plunger portion thereof, the washer or piston cup 90 in this case, however, being directed oppositely. By this means a hydraulic cylinder space is formed between the interior of the outer barrel 70 and the exterior of the bolt 71, this space being divided into two portions 91 and 92 by a partition member in the form of a collar 93 slidably mounted with respect to both the outer barrel 49 and the bolt 71, but being formed on its periphery with an annular groove 94 adapted to be engaged by a circumferential series of locking screws 95 extending radially inwards through the outer barrel, a reinforcement ring being provided for their reception. The annular groove 94 is, however, considerably wider measured axially than the diameter of the screw tips, so that an appreciable longitudinal travel of the collar 93—amounting to, say three-sixteenths of an inch—is permitted relative to the tubular barrel 49. At its ends the partition collar 93 is undercut, and is arranged to receive resilient cup washers 96 and 97 so as to form a pressure-tight sliding joint between the inner surface of the barrel and the exterior of the pin bolt. The two hydraulic compartments 91 and 92 are provided with pipe connections 98 and 99 respectively, which are joined to the pipes 23 and 24 respectively of the master cylinder unit. Where a plurality of spar pins are to be operated simultaneously, as for example in the case of folding wing biplanes, the pipes 23 and 24 can be provided with branches 100 and 101 which lead to the hydraulic compartments of the other spar pin or pins. It will be seen that when the valve 17 is in the "safe" position as shown in Figure 1, operation of the master cylinder will deliver pressure fluid into the compartment 91 and will thus augment the tendency of the spring 85 to return the plunger 59 to its operative position.

It is found that the slight axial play of the collar 93 permitted by the groove 94 is important for the proper operation of the unit, as this enables the first part of the master cylinder stroke to be effected at low pressure and thus enables the rim of the cup 40 to pass the breathing aperture or apertures 47 before any considerable pressure is attained. Thus, by referring particularly to Figures 1 and 4, it will be seen that when the push button 60 is depressed and the lever 53 operated, pressure fluid will enter the compartment 92 and will force the collar 86 to the left, at the same time compressing the spring 85 and withdrawing the plunger 59 until it assumes the position indicated at 59a. At the same time the tail 76 is also moved through the cap 79 as shown in Figure 4, thus extending the boot 83 and providing an indication that the plunger 59 is withdrawn.

During normal service the nut 78 is anchored upon the tail 76 by means of a split pin or equivalent locking means 102, which in the event of emergency can be fairly readily removed so as to permit the nut 78 to be rotated relative to the tail 76 and collar 81, thus withdrawing the bolt 71 as shown in Figure 5. In this case the boot 83 does not expand but it is securely held against twisting by the engagement of the square hole in the collar 81 with the tail portion 76. This mechanical actuation is especially useful when the aircraft is being overhauled or repaired, as it may possibly happen that the spar pins require withdrawal, while the hydraulic system is drained or is otherwise inoperative.

It will be seen that the invention thus provides in particular an extremely compact and serviceable form of spar pin system which can readily be installed, and which avoids the considerable inconvenience which is at present experienced in directly actuating the existing mechanical locking means, especially where such means are comparatively inaccessible. The invention is not limited, however, to the example described, and the improved master cylinder may be used in conjunction with any double-acting motor cylinder or equivalent for providing a positive movement in either of two directions, while, of course, the multi-way valve used for directing the path of the pressure fluid delivered by a master cylinder need not be formed as part of the latter, but can, if desired, be included elsewhere in the hydraulic system. Moreover, spar pin units in accordance with the invention can be operated by any suitable master cylinder arrangement, while other means may be employed for obtaining the lost motion effect.

What I claim is:—

1. In a hydraulic system for remotely controlling a sliding bolt by liquid pressure, a master cylinder and master piston, a reservoir, a breathing hole in the master cylinder being uncovered by the master piston when the latter is in its completely retracted position so as to place the master cylinder space into connection with the reservoir, a motor cylinder, a pipe line connecting the master cylinder with the motor cylinder, a motor piston slidable in said motor cylinder, a sliding bolt secured to said piston and a wall in the motor cylinder, said wall having a limited free movement in the motor cylinder so as to give way freely under the action of liquid delivered by the initial part of the movement of the master piston and thus prevent the rise of pressure in the master cylinder until after the master piston has well covered the breathing hole.

2. In a hydraulic system for controlling a sliding bolt by liquid pressure, a master cylinder and master piston, a reservoir, a breathing hole in the master cylinder being uncovered by the master piston when the latter is in its completely retracted position so as to place the master cylinder space into connection with the reservoir, a motor cylinder, a pipe line connecting the master cylinder with the motor cylinder, a pair of motor pistons slidable in the motor cylinder, a sliding bolt holding the pistons in spaced relationship and a partition member disposed between said pistons, said partition member being slidable within limits in the cylinder so as to prevent the pressure from rising in the master cylinder until after the master piston has well covered the breathing hole.

3. In a hydraulic system for controlling a sliding bolt by liquid pressure, a master cylinder and master piston, a cup packing upon the front of the master piston, a reservoir, a breathing hole in the master cylinder being uncovered by the packing cup of the master piston when the latter is in its completely retracted position so as to place the master cylinder space into connection with the reservoir, a motor cylinder, a pipe line connecting the master cylinder with the motor cylinder, a motor piston slidable in said motor cylinder, a sliding bolt secured to said piston, a partition in the motor cylinder slidably mounted relative to both the sliding bolt and the motor cylinder, and means for limiting the movement between the partition and cylinder to a small fraction of the stroke of the motor piston, whereby the pressure is prevented from rising in the master cylinder until after the packing cup of the master piston has well covered the breathing hole.

4. In a hydraulic system for controlling a sliding bolt by liquid pressure, a master cylinder and master piston, a reservoir, a breathing hole in the master cylinder being uncovered by the master piston when the latter is in its completely retracted position so as to place the master cylinder space into communication with the reservoir, a motor cylinder, a pair of motor pistons slidable in the motor cylinder, a sliding bolt holding the pistons in spaced relationship, a partition member disposed between said pistons and slidable within limits in the cylinder, a valve, a pair of pipe lines connecting the respective sides of the motor cylinder partition with the valve, and a pipe line connecting the master cylinder with the valve whereby pressure liquid can be fed to either side of the motor cylinder partition according to the direction in which the sliding bolt is to be moved, the free movement of the partition preventing the liquid pressure from rising in the master cylinder until the master piston has moved well beyond the breathing hole.

5. In a hydraulic system for controlling a sliding bolt by liquid pressure, a master cylinder and master piston, a reservoir, a breathing hole in the master cylinder being uncovered by the master piston when the latter is in its completely retracted position so as to place the master cylinder space into connection with the reservoir, a motor cylinder, a pipe line connecting the master cylinder with the motor cylinder, a motor piston slidable in the motor cylinder, a sliding bolt secured to said piston, a partition member in the motor cylinder formed with a circumferential recess, a pin extending radially into the motor cylinder and engaging the recess so as to allow a limited axial movement of the partition member and thereby prevent the pressure from rising in the master cylinder until the master piston has moved well beyond the breathing hole at the beginning of its stroke.

FRANCIS VICTOR BROWN.